Nov. 14, 1939.   P. DRUMMOND   2,179,816
CLOSURE FOR DRY CELLS
Original Filed Nov. 30, 1932

INVENTOR
PRICE DRUMMOND
BY
ATTORNEY

Patented Nov. 14, 1939

2,179,816

UNITED STATES PATENT OFFICE 2,179,816

CLOSURE FOR DRY CELLS

Price Drummond, Lakewood, Ohio, assignor, by mesne assignments, to Union Carbide and Carbon Corporation, a corporation of New York Original application November 30, 1932, Serial No. 645,008, now Patent No. 2,060,799, dated November 17, 1936. Divided and this application September 23, 1936, Serial No. 102,091

4 Claims. (Cl. 136—133)

The invention pertains to the portion of a dry cell that joins the upper end of the zinc can to the upper end of the carbon electrode and forms the final closure.

More specifically, the invention pertains to means for closing the annular opening in partially completed dry cells between the upper end of a cylindrical container of zinc or other metal, outer electrode, or anode, having a closed bottom, and the upper end of a central, inner, or axial carbon electrode or cathode.

One of the objects of the invention is to provide a closure having component parts that may be both preformed and assembled to the cell by machine.

Another object is to provide a closure wherein the size and character of the opening for venting cell gas may be more accurately predetermined and controlled.

Other objects are to provide a closure that is lighter in weight, more rugged in structure, less liable to damage, lower in cost and occupies less space than those previously known; and is both distinctive and pleasing in appearance.

Figure 1:
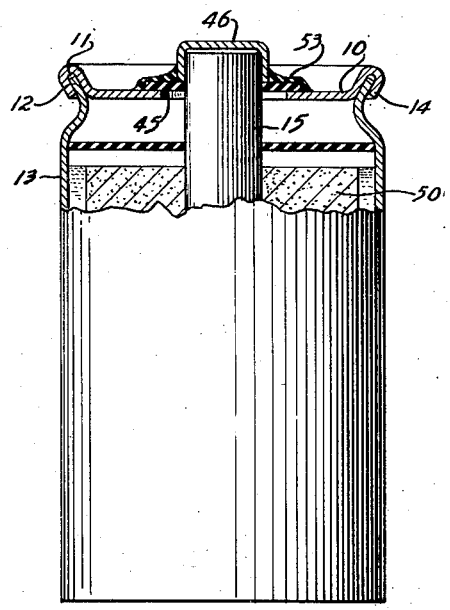
Figure 2:
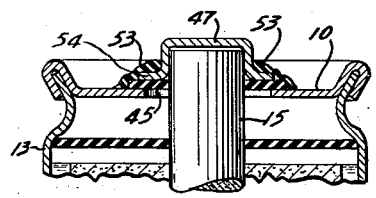
Figure 3:
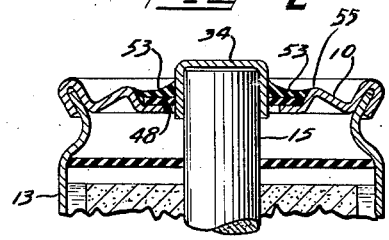
Figure 4:
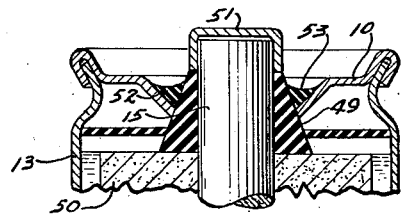

These and any other objects and novel features will appear in the following specification and the accompanying drawing, in which:

Fig. 1 is an enlarged view partly in section along a vertical plane, of a cell embodying one example of an application of my invention, and, Figs. 2 to 4 are enlarged sectional views along a corresponding plane of the upper ends of similar cells embodying other examples of applications of my invention.

The closure comprises a conductive top for a dry cell and means for effecting a suitable junction or joint between the top and the metallic can (e. g., zinc) and between the top and the carbon electrode.

The closure may also comprise a conductive electrode cap of usual or special form on the carbon electrode, and both the electrode cap and the zinc can may interfit with other parts of the closure to provide suitable joints of which at least one holds the closure in place, at least one comprises a dielectric, and one may provide a vent for the escape of gas from within the cell, or both joints may be substantially gas tight. The cap may be considered part of the inner electrode and the top considered part of the outer electrode, so that the dielectric extends from one electrode to the other.

One of the junctions may be a joint of compression normaly held closed by resilient pressure of one member upon another, but adapted to have the pressure removed or decreased by gas pressure within the cell on one of the members to open the joint and provide a vent for the escape of gas.

Either one or both of the junctions may be still further sealed by the application of a suitable adhesive dielectric material such as a covering, coating, or filling, of varnish, lacquer, cement, resin, asphaltum, or thermoplastic material.

The cells may also be provided with a vent already known in the art such as one through a porous dielectric washer disclosed and claimed in application No. 456,172, filed by R. R. Smith (now Patent 2,060,832, dated November 17, 1936), or one through the carbon electrode and electrode cap covered by Patent 1,836,903 granted to N. K. Chaney.

The form structure, and relative arrangement of the component parts of the closure, and especially the joint between the metal top and the central electrode is deemed novel.

In all of the examples the closure comprises an annular top of relatively thin resilient sheet metal such as steel, iron, or brass, between .010 and .030 inch in thickness having the outer margin thereof rigidly secured to the upper edge or end of the zinc can or container electrode, and a preformed annular, rigid, dielectric sealing member between the inner margin thereof and the inner carbon electrode, or a metal electrode cap thereon, to electrically separate the electrodes and normally provide a substantially gas tight closure for the annular opening between the upper end of the can and the outer surface of the upper end of the inner electrode.

The drawing shows the specific structure of a number of closures each embodying an example of the application of my invention to a dry cell.

While the invention may be applied to dry cells of any size, it is especially adapted to flashlight cells such as sizes C, D, E and F, defined in Table I of the Circular of the Bureau of Standards, No. 390.

In all of the examples shown in Figs. 1 to 4, an annular top 10 is provided with an annular flared recess 11 in which a similarly flared upper end or edge 12 of a zinc can or container electrode 13 is securely held by a joint of compression, formed by crimping, rolling, or forming the outer margin 14 of the metal top 10 to the upper end 12 of can 13 to close the recess 11 thereon. In order not to increase the diameter of the cell the flared upper end 12 may be offset inwardly so that the outer edge of the metal top does not project beyond the outer surface of the cylindrical can 13.

The interior of the cell, to which the closures are applied, is already known in the art and comprises a suitable mix bobbin 50 surrounding the lower portion of a central, or axial cylindrical carbon electrode 15 that extends upward a short distance above the upper end of can 13. The rest of the interior structure is not specifically defined as it forms no part of the invention.

In the embodiment shown in Fig. 1 the inner margin of dielectric member 45 forms a joint of compression with the outer surface of carbon electrode 15, and also with the lower end of conductive cap 46 rigidly secured thereon, and the lower side of the outer margin forms a compression joint with the upper surface of the inner margin of top 10. The joint between the inner and outer electrodes, although sealed by compression with the dielectric member, may be still further sealed by an exterior coating or covering of adhesive dielectric material 53 which may be applied to the joint and the closure adjacent the joint when in a fluid condition and then allowed to set or harden.

The embodiment shown in Fig. 2 is similar to that shown in Fig. 1, with the exception that the lower end of conductive cap 47 is provided with an annular flange 54 that extends outwardly and forms a compression joint with the upper surface of dielectric member 45. The joints of this closure may also be still further sealed by an exterior coating or covering of adhesive dielectric material 53 such as that described in connection with Fig. 1.

In the embodiment shown in Fig. 3, the conductive cap 34 on the upper end of the carbon electrode 15 is somewhat longer than that shown in Fig. 1, and also the conductive top 10 is provided with an annular upwardly extending ridge 55 between its inner and outer portions, thereby forming an annular recess or depression adjacent the inner margin in which the dielectric member 48 is secured. The inner margin of this dielectric member forms a compression joint with the outer surface of conductive cap 34, and the under side of the outer margin of the dielectric member forms a compression joint with the upper surface of the inner portion of conductive top 10. The joints between the inner and outer electrodes may be further sealed by an exterior coating or covering of an adhesive dielectric material 53 such as a thermoplastic material which may substantially fill the annular recess in the top 10 above the dielectric member 48 and adjacent the inner electrode.

In the embodiment shown in Fig. 4, the dielectric member 49 may have the form of a hollow truncated cone extending from the upper end of the mix bobbin 50 to the lower end of the electrode cap 51. This member may be provided with a cylindrical axial opening closely fitting or forming a joint of compression with the outer surface of electrode 15, and the conical outer surface may form a compression joint with the inner margin of conductive top 10. Also, the inner margin of top 10 may be provided with a downwardly turned portion 52, thereby forming an annular recess adjacent the dielectric member 49. Furthermore, the joint between the dielectric member 49 and the inner margin of top 10 may be further sealed by an exterior coating or filling of adhesive dielectric material such as a thermoplastic material 53 which may substantially fill the annular recess between the down-turned inner margin 52 and the top 10, and the outer conical surface of the dielectric member 49.

The dielectric sealing washer may be of paper, rubber, fiber, pulpboard, or any similar or equivalent material, and when of porous material the pores may be either partially or entirely filled with a water-repellent material such as a mixture of rosin and paraffin.

This application is a division of my copending application, Serial No. 645,008, filed November 30, 1932 (now Patent 2,060,799, dated November 17, 1936).

Various changes in shape, form, and relative arrangement of the component parts may be made so long as the function is retained, and other similar and equivalent materials may be employed without departing from the range of the invention or the scope of the claims.

I claim:

1. In a dry cell, an inner electrode comprising a carbon rod and a conductive cap thereon; an outer electrode comprising a metal can and a conductive top having the outer margin thereof secured to said can and the inner margin thereof spaced outwardly below the top of said inner electrode and having an annular sloping midportion between said margins; a preformed rigid dielectric member having the inner margin thereof forming a compression joint with said conductive cap, and the outer margin thereof forming a compression joint with the upper surface of said sloping midportion of said outer electrode; and an exterior body of thermoplastic sealing material covering the joints between said dielectric member and said electrodes.

2. In a dry cell having an outer electrode and an inner electrode; a closure comprising a conductive cap on said inner electrode and forming a portion thereof; a conductive top having a downwardly and inwardly sloping midportion and having a margin adjacent said inner electrode and a margin secured to said outer electrode and forming a portion thereof; a dielectric washer exterior of said outer electrode and having the inner margin thereof forming a joint with said conductive cap and the outer margin thereof forming a compression joint with the upper surface of the conductive top at said midportion; and thermoplastic means covering said washer and the exposed adjacent upper margins of the top for sealing said joints.

3. In a dry cell, an outer electrode comprising a metal can; a conductive top having the outer margin secured to said can, and having an upwardly sloping annular ridge separating said top into inner and outer marginal portions; an inner electrode comprising a carbon rod within said can; a conductive cap on the upper end of said electrode and spaced inwardly from said top; an annular dielectric member having its inner margin forming a compression joint with said cap, and having an outer margin thereof forming a compression joint with the upper surface of said inner marginal portion of said top adjacent said ridge; and a body of thermoplastic dielectric sealing material extending between said ridge and said cap.

4. In a dry cell, an outer electrode comprising a metal can; a conductive annular top having an upwardly extending annular ridge separating said top into inner and outer marginal portions, the said top having the outer margin secured to said can; an inner electrode comprising a carbon rod and a conductive cap thereon within said can and spaced inwardly from the inner margin of said top; a preformed rigid dielectric member having its outer margin forming a compression joint with the upper surface of said inner marginal portion of said top adjacent said ridge, and having the inner margin thereof forming a compression joint with the outer surface of said cap; the said inner marginal portion of the conductive top defining an annular recess surrounding said inner electrode and housing said dielectric member.

PRICE DRUMMOND.